UNITED STATES PATENT OFFICE.

RICHARD L. CAWOOD, OF EAST LIVERPOOL, OHIO.

PLASTIC MATERIAL AND PROCESS OF PRODUCING THE SAME.

1,414,254. Specification of Letters Patent. Patented Apr. 25, 1922.

No Drawing. Application filed December 24, 1921. Serial No. 524,749.

*To all whom it may concern:*

Be it known that I, RICHARD L. CAWOOD, a citizen of the United States of America, residing at East Liverpool, in the county of Columbiana and State of Ohio, have invented certain new and useful Improvements in Plastic Materials and Processes of Producing the Same, of which the following is a specification.

My invention relates to the general class of plastics, and particularly to a novel clay product and method of preparing the same. The object of my invention is to produce a kaolin having certain novel characteristics which improve it for use in the manufacture of china and porcelainware, and to obtain my new product by a method of operation which not only utilizes, in the article produced, practically 100% of the material taken from the clay deposits, but also yields a valuable by-product.

The method now universally practiced for the separation of the kaolin from the deposits in which it is found, consists in washing the mined material with water, which takes up the kaolin in solution or suspension. The kaolin thus separated from the raw clay material is recovered from the wash water by evaporation of the latter, and the remaining material is thrown away as waste. Now kaolin is formed from decomposed felspathic rock, or kaolinized felspar, and it is only the thus fully decomposed rock or kaolin that is recovered in the ordinary washing process. I have discovered that the partially decomposed rock of certain clay deposits, particularly those of North Carolina white clay, when comminuted, forms with fully decomposed rock a true kaolin having certain characteristics not possessed by any of the clays now in use, but rendering it very valuable in the manufacture of china and porcelain ware.

The method of producing this novel kaolin consists in submitting the crude or raw clay from the pit to a simultaneous washing and intensive grinding operation, in any suitable mill, such as a pebble mill or a buhrstone mill. In this operation the partially decomposed, and even the still hard felspar, quartz and flint rock present in the raw clay, is comminuted to a fineness commensurate with that of the fully decomposed felspar or natural kaolin, and affords a fine, smooth kaolin-like mass. In the process of comminution, the mica which is usually present in the deposit, is reduced to fine particles. These are objectionable in a pottery clay, but form a valuable by-product which may be readily recovered by running the fluid kaolin mass from the mill through a fine screen, such as a fine-mesh lawn. The clay which is in suspension passes through the lawn, leaving the mica on the screen. The screened mica is washed to remove adherent clay, (the wash water being used in the mill by preference so that no clay is lost), and the clean mica is recovered in marketable condition. The clay suspension passing through the lawn is evaporated and the dry clay residue is ready for the market. There is thus no loss whatsoever of material mined from the clay bank.

As above stated, the kaolin-like product thus obtained presents novel characteristics over standard kaolin—even from the same clay pits. Whether or not a chemical change takes place as a result of the comminution of the partially decomposed felspathic rock, etc., in the presence of water, I am not prepared to state. It is a fact, which has been established not only by myself, but by others as well, that the kaolin so prepared has valuable new characteristics not found in any kaolin now available.

For example, it is far superior in color to the best English china clays, being not only much whiter, but of much finer texture. Its shrinkage is no greater than the English clay—a feature of great practical importance. It has greater tensile strength than any other china clay. In fact it is as strong as the average semi-porcelain body, thus cutting down losses in green ware. It does not tend to vitrify, but remains a true kaolin when burned as high as cone 12. That the product is a true kaolin is apparent from the fact that when substituted for the usual washed clay from the same deposit, or for English clay, in a semi-porcelain body, the latter becomes translucent, when the bisque is burned to cone 8 down and cone 9 turning. This is true even when the present clay is added to the semi-porcelain body to the extent of 25% of the total body. Such ware will not craze when subjected to the usual boiling salt solution. Samples made with the present clay forming as high as 80% of the total body, stand without warping or twisting in the kiln and bake perfectly straight with the color pure white.

Used in combination with standard body mix for pottery, the present clay forming 20 to 25% of the body, a stronger piece of ware is obtained in the green state, and a harder and tougher piece of ware when finished in the glost. In my experience, plates burned in the glost kiln up to cone 6 with the plates pinned, come from the glost kiln straight, with no tendency to go down in the kiln under average fire, although the ware shown a translucency.

In brief, the present product is of better color than any imported or domestic kaolin; is cleaner and more uniform than any domestic kaolin; its shrinkage is not more than that of the average imported china clay; and it prevents cracking when used in both jiggered and cast ware. It makes a stronger piece of ware in the green state, does not twist or bend in the bisque kiln; and will stand as hard fire in the glost kiln as any semi-porcelain now used; it is uniform in color and in shrinkage. Moreover it possess greater plasticity than any known china clay, thus rendering it possible to use the present product in any desired proportion in the body mix.

The characteristics possessed by the present product are the more remarkable when compared with the characteristics of the kaolin derived from the same clay pit by the usual washing process. The difference of the present product may be appreciated by the comparison of the following analyses. Thus, the raw clay from the pit has the following average composition:

| | |
|---|---|
| $SiO_2$ | 47.83% |
| $Al_2O_3$ | 38.17 |
| $Fe_2O_3$ | 1.00 |
| Loss upon ignition | 13.00 |

The same clay after subjection to the treatment above specified, and the ground mica removed, has the following composition:

*Chemical analysis.*

| | |
|---|---|
| $SiO_2$ | 50.00% |
| $Al_2O_3$ | 35.35 |
| $Fe_2O_3$ | .43 |
| $CaO$ | trace |
| $TiO_2$ | trace |
| $MgO$ | .43 |
| $K_2O$ | .39 |
| $Na_2O$ | 1.56 |
| Loss upon ignition | 12.09 |

*Rational analysis.*

| | |
|---|---|
| Clay substance | 87.35% |
| Feldspar | 10.29 |
| Quartz | 2.36 |

Molecular construction $10(K_2O, Al_2O_3, 6SiO_2) + 87(Al_2O_3, SiO_2, 2H_2O) + 2SiO_2$.

The standard kaolin obtained by the usual washing process from North Carolina deposits has the following composition:

| | |
|---|---|
| $SiO_2$ | 46.80% |
| $Al_2O_3$ | 39.20 |
| $Fe_2O_3$ | 1.00 |
| Loss upon ignition | 13.00 | as compared with the usual English china clay, the average composition of which is:

| | |
|---|---|
| $SiO_2$ | 47.68% |
| $Al_2O_3$ | 37.85 |
| $FeO_3$ | .31 |
| $TiO_2$ | .04 |
| $K_2O$ | 1.40 |
| $Na_2O$ | .14 |
| Loss upon ignition | 12.60 |

It is possible that the novel behavior of the present kaolin is due in part to a chemical transformation incident to the extreme comminution rather than to any chemical reaction with water. It may be that some heat is generated at the moment when the particles are subjected to the crushing action of the grinder which actually promotes a chemical transformation. The true explanation of just what occurs in the process of grinding is not well developed. The fact remains, however, that a new kaolin has been obtained by the breaking down of the partially and wholly undecomposed kaolin elements of the raw clay from the pit, and that the new product has valuable characteristics in the art not possessed by any kaolin now available. In addition to this fact, the discovery completely eliminates a large waste of raw material, frequently averaging as high as 80% of the mined clay, and yields a valuable by-product in the form of fine mica.

I am of course well aware of the fact that in preparing a batch of clay in the pottery, it is customary to grind kaolin with the usual body mix for the purpose of securing an intimate mixture of the elements, and to reduce any lumps that may be present. This of course has no relation to the present invention, which is concerned not with the pottery mix, but with the production of a kaolin for use in such a mix.

While the invention is particularly applicable to North Carolina white clays, it may be applied, with appropriate modifications when necessary, to the preparation of kaolin from any natural clay deposit in which the condition of the materials is suitable.

I claim—

1. A method of manufacturing a potter's clay having the characteristics of a true kaolin, which comprises subjecting a mixture of partially and wholly kaolinized feldspar as dug from and in substantially the proportion in which they occur in a natural deposit, to comminution in the presence of water, removing mica therefrom and eliminating excess water from the mass.

2. As a new article of manufacture, a natural mixture of kaolin and feldspathic rock in different stages of kaolinization, wet ground to comminuted condition and free of contained mica, and having the characteristics of a true kaolin suitable for use as the kaolin constituent of a potter's mix.

3. As a new article of manufacture, a natural mixture of kaolin and feldspathic rock in different stages of kaolinization, wet ground to comminuted condition and free of contained mica and excess moisture, and having the characteristics of a true kaolin suitable for use as the kaolin constituent of a potter's mix.

4. As a new article of manufacture, a white potter's clay having the characteristics of a true kaolin, and comprising a natural mixture of kaolin and feldspar in different stages of kaolinization, wet ground to comminuted condition and free of comminuted mica, and having great plasticity and tensile strength, showing no tendency to vitrify at usual kiln heats, free from crazing and capable of forming 80% of potter's mix.

In testimony whereof I have signed my name to this specification.

RICHARD L. CAWOOD.